United States Patent
Flora et al.

(10) Patent No.: US 12,245,551 B2
(45) Date of Patent: Mar. 11, 2025

(54) TREE FRUIT OR NUT HARVESTER TO MINIMIZE MACHINE PASSES IN THE ORCHARD

(71) Applicant: FLORY INDUSTRIES, Salida, CA (US)

(72) Inventors: Mike Flora, Modesto, CA (US); Brandon Eller, Ripon, CA (US); Seth Richmond, Visalia, CA (US)

(*) Notice: Subject to any disclaimer, the term of this patent is extended or adjusted under 35 U.S.C. 154(b) by 838 days.

(21) Appl. No.: 17/039,988

(22) Filed: Sep. 30, 2020

(65) Prior Publication Data

US 2021/0015044 A1 Jan. 21, 2021

Related U.S. Application Data

(63) Continuation of application No. 16/104,133, filed on Aug. 16, 2018, now Pat. No. 10,806,080.

(60) Provisional application No. 62/605,753, filed on Aug. 25, 2017.

(51) Int. Cl.
*A01D 46/20* (2006.01)
*A01D 46/26* (2006.01)
*A01D 51/00* (2006.01)

(52) U.S. Cl.
CPC .......... *A01D 46/26* (2013.01); *A01D 46/20* (2013.01); *A01D 51/002* (2013.01); *A01D 2046/262* (2013.01)

(58) Field of Classification Search
CPC ...... A01D 51/00; A01D 51/002; A01D 46/20; A01D 46/26; A01D 2046/262
See application file for complete search history.

(56) References Cited

U.S. PATENT DOCUMENTS

| | | |
|---|---|---|
| 1,439,266 A | 12/1922 | Shaw |
| 1,558,924 A | 10/1925 | Riggs |
| 2,561,882 A * | 7/1951 | Patton .................. A01D 51/002 |
| | | 15/340.1 |
| 2,854,808 A | 10/1958 | Ramacher |
| 2,916,868 A | 12/1959 | Leslie |
| 3,100,368 A | 8/1963 | Logan |
| 3,332,220 A | 7/1967 | Earston |
| 3,462,932 A | 8/1969 | Pool |
| 3,548,579 A | 12/1970 | Shipley |
| 3,553,949 A | 1/1971 | Rauth |
| 3,619,997 A | 11/1971 | Wood |

(Continued)

FOREIGN PATENT DOCUMENTS

WO      WO-9300794 A1 *   1/1993   ........... A01D 51/002

OTHER PUBLICATIONS

COE C7 R-Series MK2 Catching Frame Shaker Webpage retrieved on Jan. 15, 2019 from "https://www.coeshakers.com/equipment/c7/".

(Continued)

*Primary Examiner* — Adam J Behrens
(74) *Attorney, Agent, or Firm* — Sierra IP Law, PC; William K. Nelson

(57) ABSTRACT

A harvesting machine comprising a shaking mechanism operable to shake fruit or nuts from a tree or bush; a deflection plate for directing the fruit or nuts to an area away from the base of the tree or bush; and a device for moving fruit or nuts from the base of the tree or bush to the area away from the base of the tree or bush is disclosed. The deflection plate may be positioned at an angle of between 0° to about 75° relative to the horizontal.

15 Claims, 11 Drawing Sheets

(56) References Cited

U.S. PATENT DOCUMENTS

| | | |
|---|---|---|
| 3,626,677 A | 12/1971 | Sides |
| 3,667,200 A | 6/1972 | Pool |
| 3,693,331 A | 9/1972 | Richter |
| 3,728,850 A | 4/1973 | Flory |
| 3,762,140 A * | 10/1973 | Block ............... A01D 51/002 56/10.4 |
| 3,863,430 A | 2/1975 | Jennings |
| 3,879,923 A | 4/1975 | Granger |
| 3,893,286 A * | 7/1975 | Buttram ............. A01D 51/002 15/82 |
| 3,914,925 A * | 10/1975 | McRobert ........... A01D 51/002 56/328.1 |
| 3,945,178 A | 3/1976 | Delfosse |
| 4,008,059 A | 2/1977 | Monson et al. |
| 4,033,100 A * | 7/1977 | McRobert ........... A01D 51/002 56/328.1 |
| 4,078,365 A * | 3/1978 | Ingalls ................. A01D 51/00 15/340.1 |
| 4,194,346 A * | 3/1980 | Ingalls ............... A01D 51/002 56/16.5 |
| 4,348,057 A | 9/1982 | Parenti et al. |
| 4,414,795 A | 11/1983 | Johnstone |
| 4,706,447 A * | 11/1987 | Watmough ........... A01D 51/00 56/328.1 |
| 4,869,737 A | 9/1989 | Parenti |
| 4,984,421 A * | 1/1991 | Dreux ................. A01D 51/002 56/344 |
| 5,413,453 A | 5/1995 | Hill |
| 5,469,695 A * | 11/1995 | Zehavi ................. A01D 46/26 56/329 |
| 5,473,875 A | 12/1995 | Zehavi |
| 5,816,037 A | 10/1998 | Chiel et al. |
| 5,873,226 A | 2/1999 | McLeod |
| 6,178,730 B1 | 1/2001 | Visser |
| 6,282,878 B1 | 9/2001 | Hill |
| 6,422,937 B1 | 7/2002 | McLeod |
| 6,442,920 B1 | 9/2002 | Peterson et al. |
| 6,658,834 B1 | 12/2003 | Mayo |
| 6,745,551 B2 | 6/2004 | Stackhouse |
| 6,938,403 B2 | 9/2005 | Suter |
| 6,952,914 B2 | 10/2005 | Zehavi |
| 7,412,817 B2 * | 8/2008 | Flora ................... A01D 51/002 56/328.1 |
| 8,151,410 B2 | 4/2012 | Batchelder |
| 8,166,739 B2 | 5/2012 | Dow et al. |
| 8,511,052 B2 | 8/2013 | Dow et al. |
| 9,485,912 B2 | 11/2016 | Needham |
| 9,775,293 B2 * | 10/2017 | Gilbert ................ A01D 51/002 |
| 10,178,830 B2 * | 1/2019 | Needham ............. A01D 46/26 |
| 2004/0163375 A1 | 8/2004 | Suter et al. |
| 2004/0187449 A1 | 9/2004 | Witter |
| 2005/0102779 A1 * | 5/2005 | Flora ................... A01D 51/002 15/82 |
| 2005/0166568 A1 | 8/2005 | Zehavi et al. |
| 2005/0274094 A1 | 12/2005 | DeMarco |
| 2008/0086989 A1 | 4/2008 | Sheidler |
| 2009/0196806 A1 | 8/2009 | Larnholm et al. |
| 2010/0267432 A1 | 10/2010 | Roberge |
| 2013/0014481 A1 | 1/2013 | Dow et al. |
| 2016/0138507 A1 | 5/2016 | Klassen et al. |
| 2016/0212942 A1 * | 7/2016 | Gilbert ................ A01D 51/002 |
| 2016/0341158 A1 | 11/2016 | Rosenfeld |
| 2016/0360703 A1 | 12/2016 | Leiston |
| 2017/0096971 A1 | 4/2017 | Kaufmann et al. |
| 2018/0009305 A1 | 1/2018 | Nelson |
| 2018/0027732 A1 | 2/2018 | Xu |
| 2019/0037770 A1 | 2/2019 | Dugas |
| 2019/0159404 A1 | 5/2019 | Matousek |

OTHER PUBLICATIONS

Coeshakers Webpage retrieved on Dec. 5, 2018 from "https://www.coeshakers.com/".

COE C7 R-Series MK2 Catching Frame Shaker Brochure, Jan. 22, 2018, available from "https://static1.squarespace.com/static/59a09452d482e9100d39ae59/t/5ae8d103aa4a99227fa114af/1525207334172/89079-1+COE+BROCHURE+C7-R+MK2+2018+Single+.pdf".

COE L2 R-Series MK2 Catching Frame Receiver Webpage retrieved on Jan. 15, 2019 from "https://www.coeshakers.com/equipment/12".

COE L2 R-Series MK2 Catching Frame Receiver Brochure retrieved, Jan. 31, 2018, available from "https://static1.squarespace.com/static/59a09452d482e9100d39ae59/t/5ae8d17a6d2a739ae0b3dc30/1525211933293/89079-5+BROCHURE+L2-R+MK2+2018+Single.pdf".

Orchard Machinery Corporation—Shockwave Catch-All Systems Series VII Webpage retrieved on Dec. 5, 2018 from "https://shakermaker.com/machinery/shockwave-catch-all-systems/".

WeldCraft Industries, INC Side By Side Shaker Webpage retrieved on Dec. 5, 2018 from "https://www.weldcraftindustries.com/side-by-side-shaker".

Dr.Michael Coates Profile Webpage retrieved on Dec. 5, 2018 from "http://www.plantandfood.com.au/page/our-people/profile/dr-michael-coatesr".

* cited by examiner

TREE FRUIT OR NUT HARVESTER TO MINIMIZE MACHINE PASSES IN THE ORCHARD

This application is a continuation of pending U.S. application Ser. No. 16/104,133, filed Aug. 16, 2018, which claims the benefit of U.S. Provisional Application No. 62/605,753 filed on Aug. 25, 2017, Both of the aforementioned applications are incorporated herein by this reference in their entireties.

FIELD OF INVENTION

This invention devises a method to minimize the required machine passes in an orchard by placement and/or relocation of the nuts and tree fruit by the initial harvesting operation.

BACKGROUND

Conventional methods for harvesting nuts like almonds, walnuts or pecans utilize a machine often called a tree shaker. The tree shaker grabs the tree either on the trunk or limb and vibrates the tree causing the nuts to fall to the ground. Next, a sweeper passes through and performs two operations: 1) Sweeps the nuts into a windrow and 2) Blows the nuts off of the tree row into the adjacent row. The blowing process helps remove nuts from the tree row or under the tree that are difficult to reach by a mechanical device. Once the nuts are swept into a windrow, a "pick-up" machine comes by and picks up the nuts, cleans them from dirt, leaves and sticks and then deposits them into a bin.

The process of taking the tree fruit or nut out of the tree and into a bin is not only labor intensive but also creates a lot of air born dust. It is apparent that a need exists for an improved method that not only reduces the amount of labor involved but also reduces the amount of dust created.

It is an object of the present invention to reduce or completely eliminate a separate sweeping operation. It is also an object of the present invention to provide a more environmentally friendly method of harvesting tree fruit or nuts. A further object of the present invention is to reduce the cost of labor to harvest the tree fruit or nuts.

SUMMARY OF THE INVENTION

The method and the system of this invention center on the concept of incorporating functions into a tree nut harvester so that the harvester not only removes fruit from the tree but also moves the crop away from the tree for ease of subsequent retrieval. Current machines in the industry either remove the fruit and let it drop directly to the ground, or remove and catch the fruit without allowing it to ever touch the ground. This invention is a variation of those two. The intent is to remove the crop, and strategically place it on the ground where it can dry before being taken out of the field.

A key feature of this invention is the deflector frame. This deflector is intended to prevent the removed crop from falling into the tree row area. This area is difficult to clean with the sweepers that are commonly used in the industry. The deflector would shed the harvested fruit off to the side of the tree row where it is readily available for moving into a windrow or possibly picked up from its original destination.

The harvesting apparatus of the present invention may include a shaker mechanism for grasping and shaking a tree to dislodge fruit or tree nuts from their attachment to the tree. The shaker mechanism may be a slider crank mechanism, which may or may not be an inertia type shaker, that provides a linear shaking motion, or a mechanism that uses rotating eccentric masses which normally do not provide linear motion. In embodiments utilizing a linear inertial shaker, motion may be generated by a piston rod-handle system or just by the vibration produced by an eccentric mass in rotation to generate a linear motion. In other embodiments, the shaker mechanism may utilize the rotation of eccentric weight wheels to shake a tree in multiple directions to create vibrations in the tree to dislodge a crop (e.g., fruit or nut) form the tree. For example, and without limitation, this type of vibration is carried out by the superposition of the frequencies produced by 2 or 3 wheels, with eccentric masses that rotate typically with a frequency between 10 and 40 Hz, accelerating the fruits to separate them from the trees.

Another feature of this invention, the tree row cleaner, is a blower on the harvester which would move any fruit that had fallen in the tree row area before the harvester got there. This is a naturally occurring event due to inconsistent ripening of the fruit and weather events such as wind. These previously fallen fruit are often termed "windfall". Another embodiment of the tree row cleaning could be by mechanical means such as a rotary brush which moves in and out of the tree row.

An added feature of this invention to be considered would be a "windrowing attachment". The windrowing device may be a sweeping head similar to what is found on a conventional nut sweeper. The windrowing device could also be a rotating brush or brushes. The windrowing attachment would use mechanical means to move the "windfall" fruit along the ground directly ahead of the harvester and into a windrow.

In some embodiments, the present invention relates to a harvesting machine comprising a shaking mechanism operable to shake fruit or nuts from a tree or bush; a deflection plate for directing the fruit or nuts to an area away from the base of the tree or bush; and a device for moving fruit or nuts from the base of the tree or bush to the area away from the base of the tree or bush. The deflection plate may be positioned at an angle of between 0° to about 75° relative to the horizontal (e.g., between about 5° to about 50°, between about 10° to about 40°, or any value or range of values therein). The deflection plate may include a slot for positioning around a trunk or center of the tree or bush. The harvesting machine may further include a blowing mechanism for directing the fruit or nuts away from row in which the tree or bush is positioned. The device for moving the fruit or nuts from the base of the tree or bush may be a brush having a plane of rotation that is substantially parallel to the horizontal. The brush may have a portion operable to contact the ground near the base of the tree or bush while the shaking mechanism is engaged with the tree or bush.

In further embodiments, the present invention relates to a harvesting machine comprising a shaking mechanism operable to shake fruit or nuts from a tree or bush; and a deflection plate for directing the fruit or nuts to an area away from the base of the tree or bush. The harvesting machine may further include a device for moving fruit or nuts from the base of the tree or bush to the area away from the base of the tree or bush. The deflection plate may be positioned at an angle of between about 0° to about 75° relative to the horizontal (e.g., between about 5° to about 50°, between about 10° to about 40°, or any value or range of values therein). The deflection plate may include a slot for positioning around a trunk or center of the tree or bush. The harvesting machine may further include a blowing mechanism for directing the fruit or nuts away from row in which the tree or bush is positioned. The device for moving the fruit or nuts from the base of the tree or bush may be a brush having a plane of rotation that is substantially parallel to the horizontal. The brush may have a portion operable to contact the ground near the base of the tree or bush while the shaking mechanism is engaged with the tree or bush.

In still further embodiments, the present invention relates to a method of harvesting comprising attaching a shaking mechanism operable to shake fruit or nuts from a tree or bush; positioning a deflection plate for directing the fruit or nuts to an area away from the base of the tree or bush; activating the shaking mechanism to vibrate the tree or bush; and activating a mechanism for moving the fruit or nuts away from the base of the tree or bush to the area away from the base of the tree or bush. The deflection plate may be positioned at an angle of between about 0° to about 75° relative to the horizontal (e.g., between about 5° to about 50°, between about 10° to about 40°, or any value or range of values therein). The deflection plate may include a slot for positioning around a trunk or center of the tree or bush. The method may further comprising blowing the fruit or nuts away from row in which the tree or bush is positioned using a blowing mechanism. The mechanism for moving the fruit or nuts from the base of the tree or bush may be a brush having a plane of rotation that is substantially parallel to the horizontal. The brush may have a portion operable to contact the ground near the base of the tree or bush while the shaking mechanism is engaged with the tree or bush.

DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly:

FIG. 6 is an illustration summarizing the four separate sweeper passes used to create 2 separate windrows 104 in two adjacent rows. The four passes include a first pass 1 in a first row to sweep fruit or nuts in reach of a sweeper head and brush into a windrow 104a and blow fruit or nuts out of the reach of the brushes into an adjacent row, a second pass 2 in a second row to sweep fruit or nuts in reach of a sweeper head and brush into a second windrow 104b and blow fruit or nuts out of reach of the brushes into the adjacent row, a third pass 3 to sweep fruit or nuts in the second row into windrow 104b, and a fourth pass 4 to sweep fruit or nuts in the first row into the windrow 104a.

DETAILED DESCRIPTION OF THE INVENTION

Figure 1:
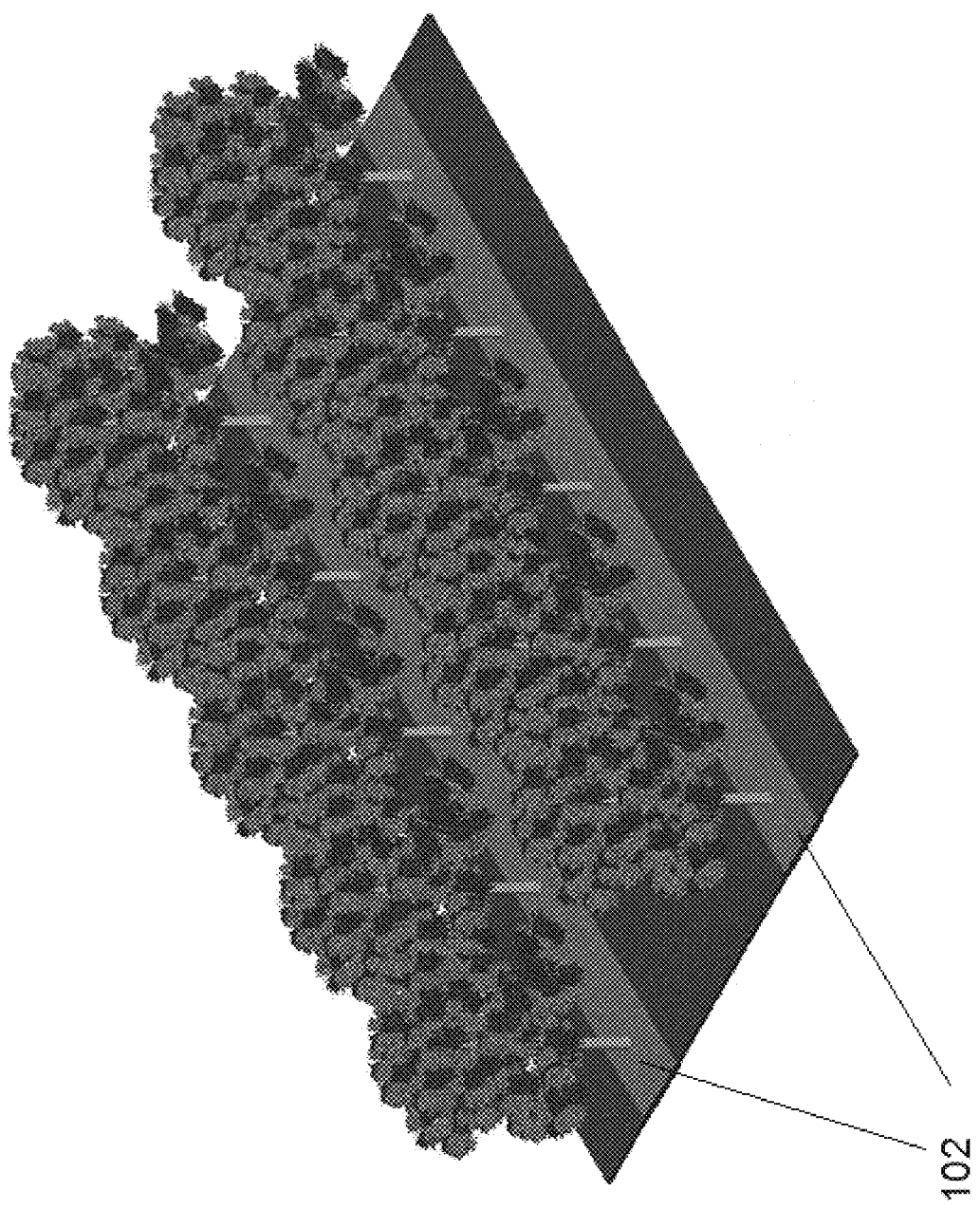
FIG. 1 is an illustration of a typical planted orchard and the area that is being considered as the tree row 102.
Figure 2:
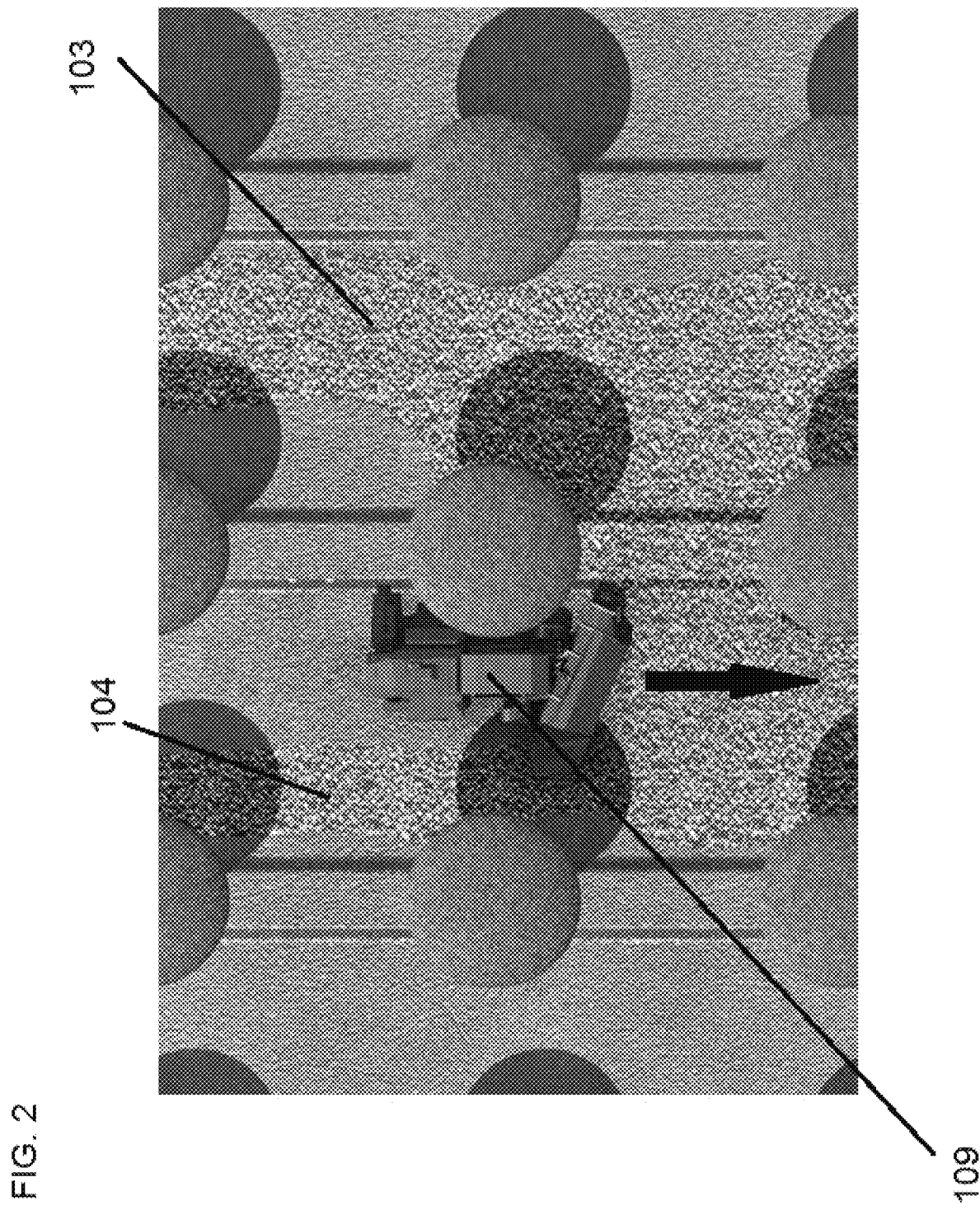
FIG. 2 is an illustration showing the first pass a conventional sweeper 109 will make in the sweeping operation. The first part of the windrow 104 is being created with this first pass which includes sweeping and blowing. The carpet of nuts 103 left by a conventional harvester.
Figure 3:
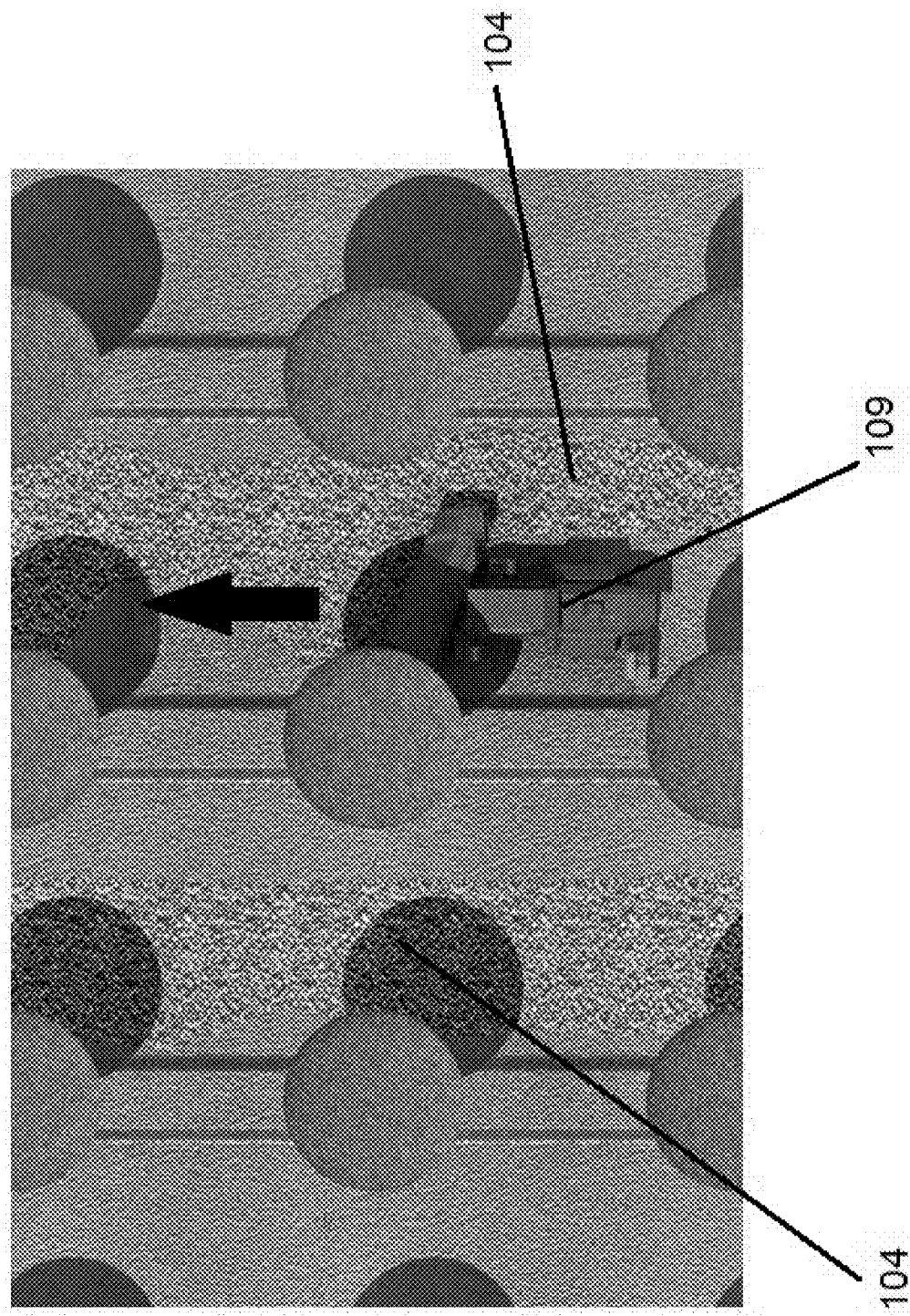
FIG. 3 is an illustration showing the second pass a conventional sweeper 109 will make in the sweeping operation, this is a sweeping and blowing pass. The first part of the swept windrow 104 is being created on the other side of the tree row with this second pass.
Figure 4:
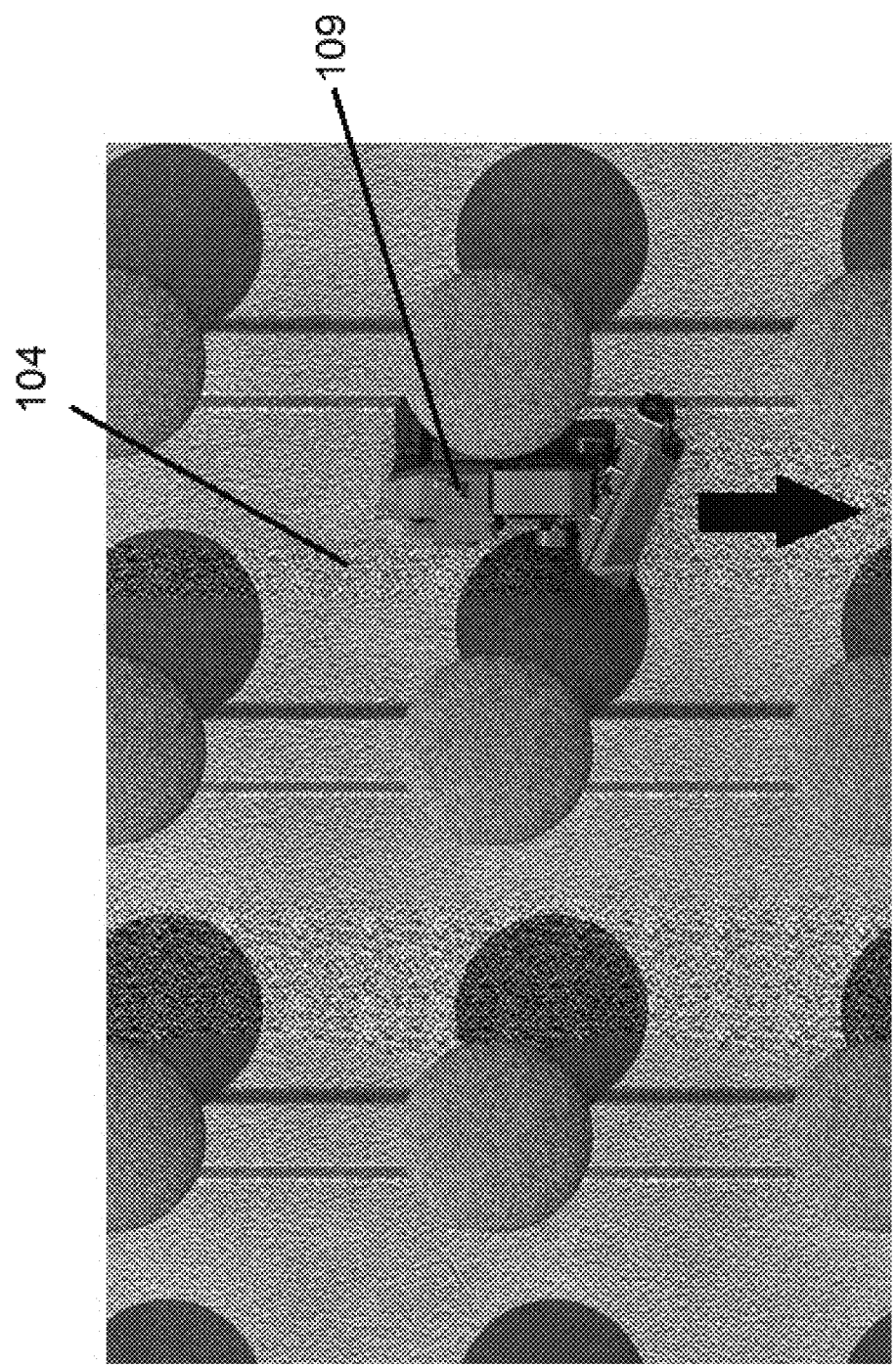
FIG. 4 is an illustration showing the third pass, sweeping only, which a conventional sweeper 109 will make. This pass will complete one of the two swept windrows 104.
Figure 5:
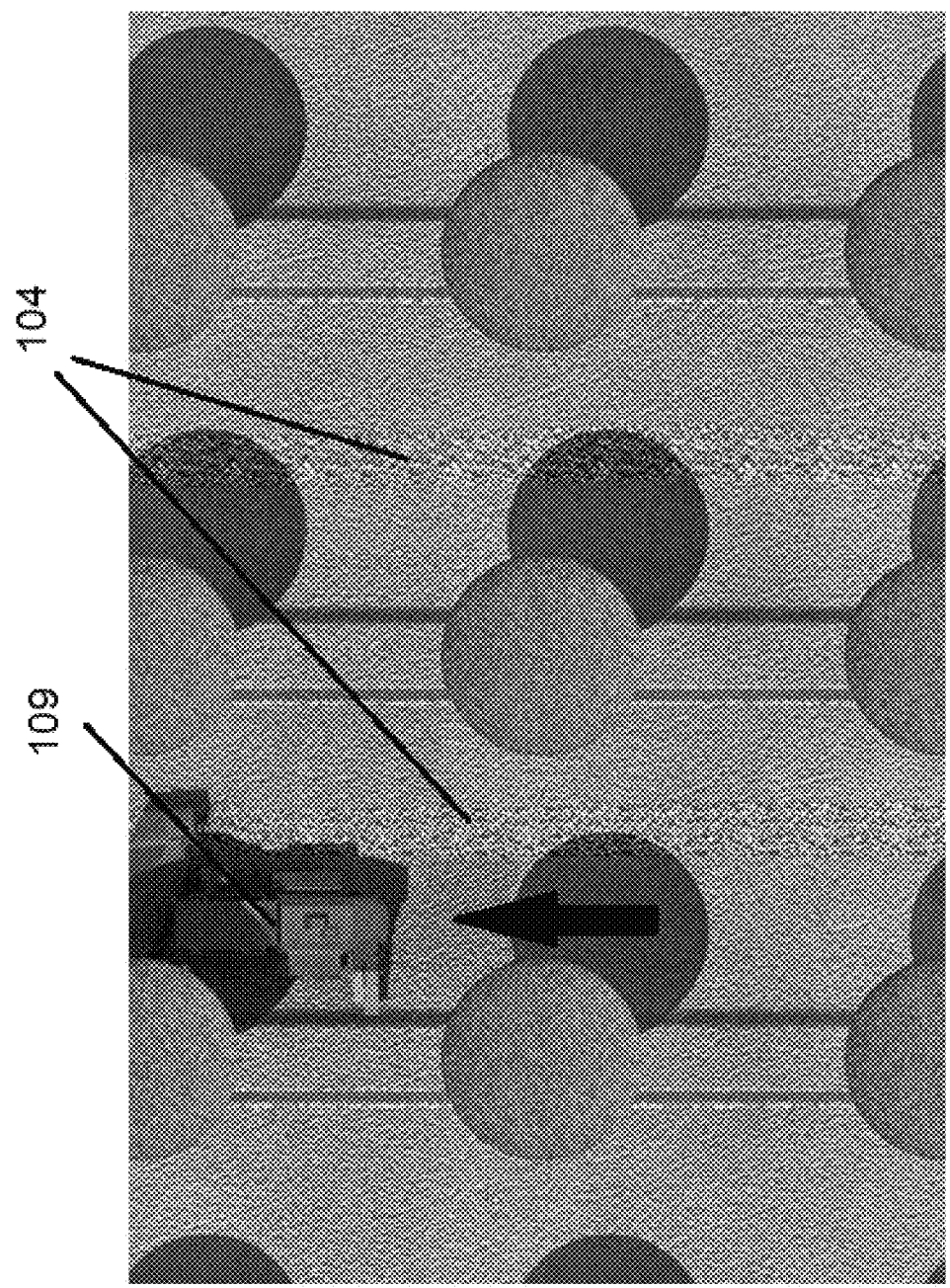
FIG. 5 is an illustration showing the fourth and final pass a conventional sweeper 109 will make in the sweeping operation. This sweeping only pass will complete the second of the two swept windrows 104.
Figure 6:
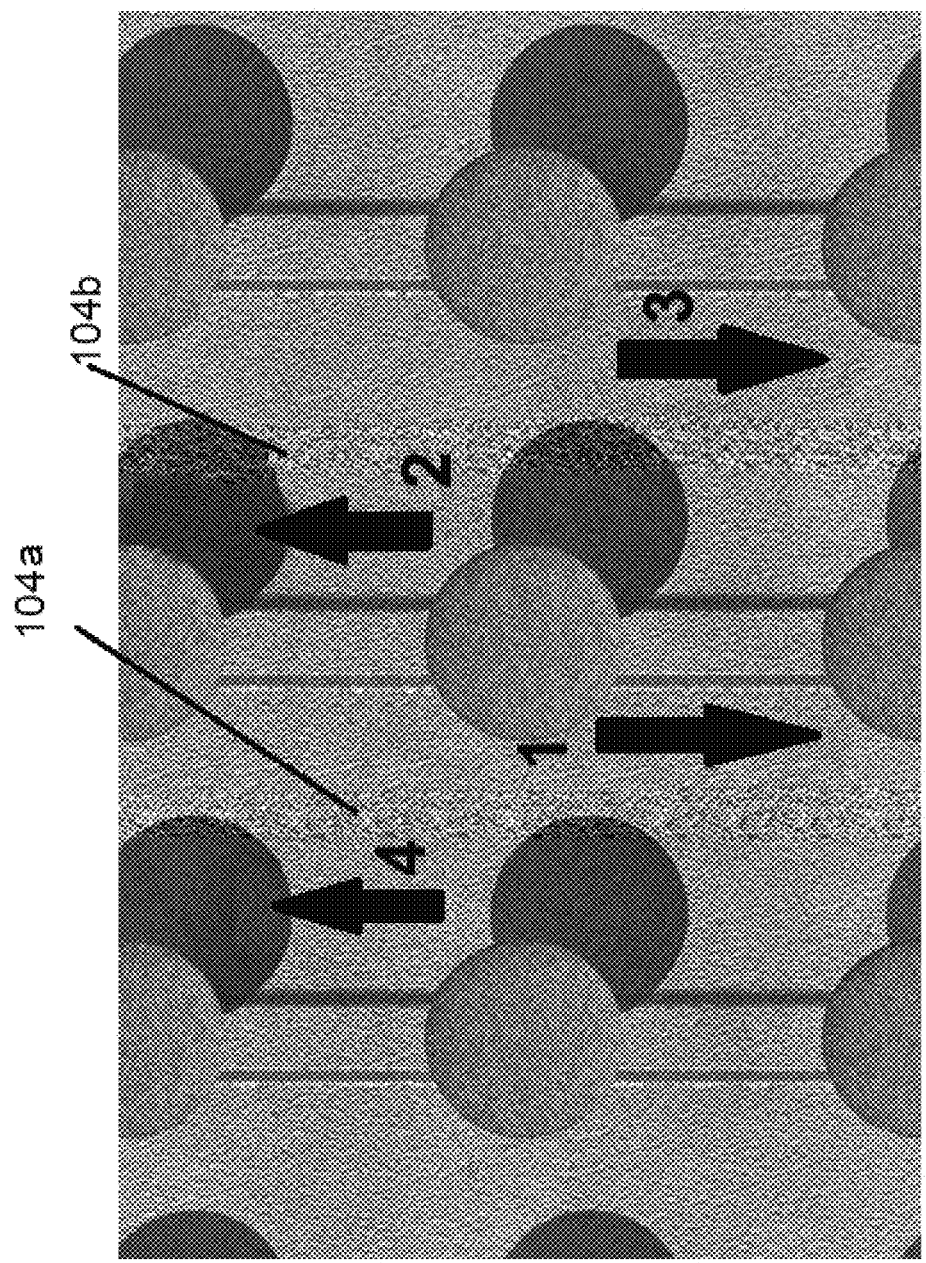
Figure 7:
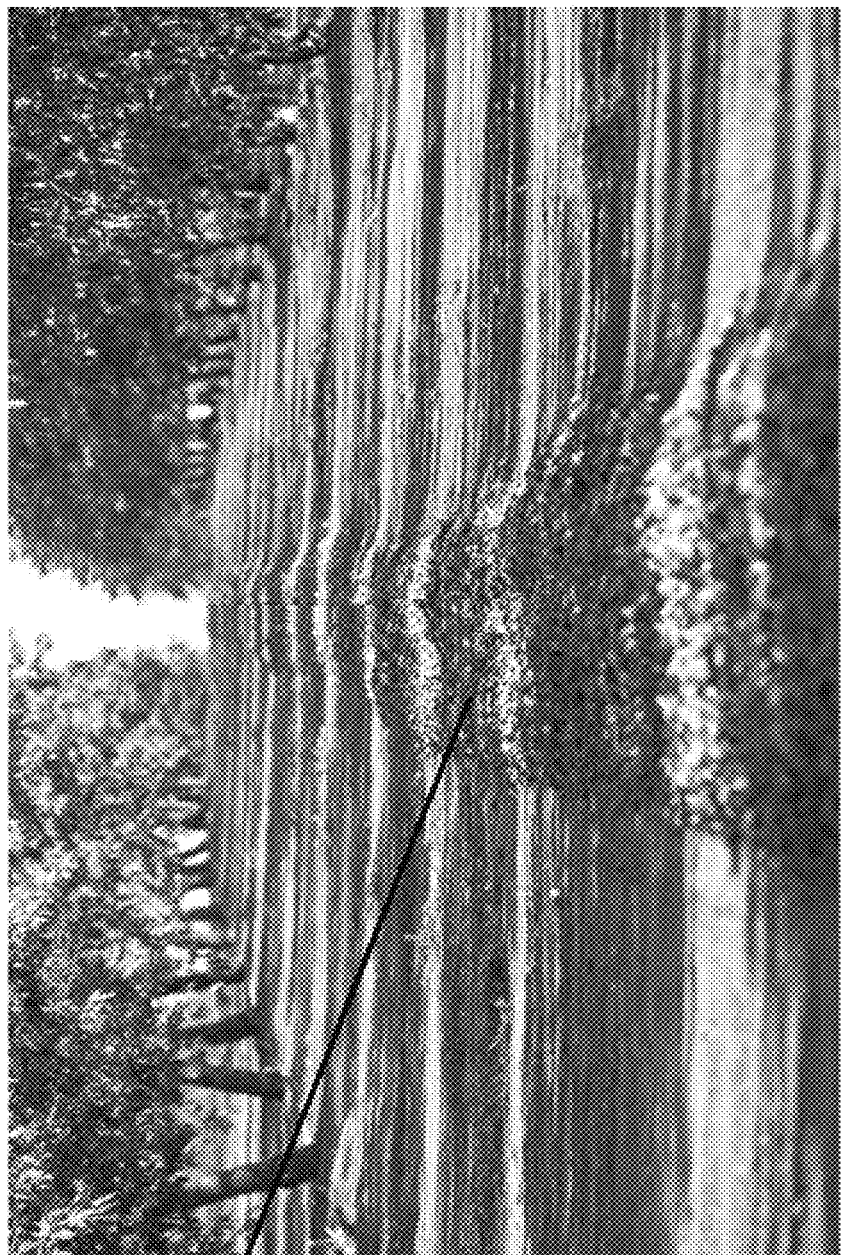
FIG. 7 is a picture of what is referred to as a swept windrow 104. This is typically what is left after a sweeper pushes the nuts while on the ground into a long row in between the tree rows.
Figure 8:
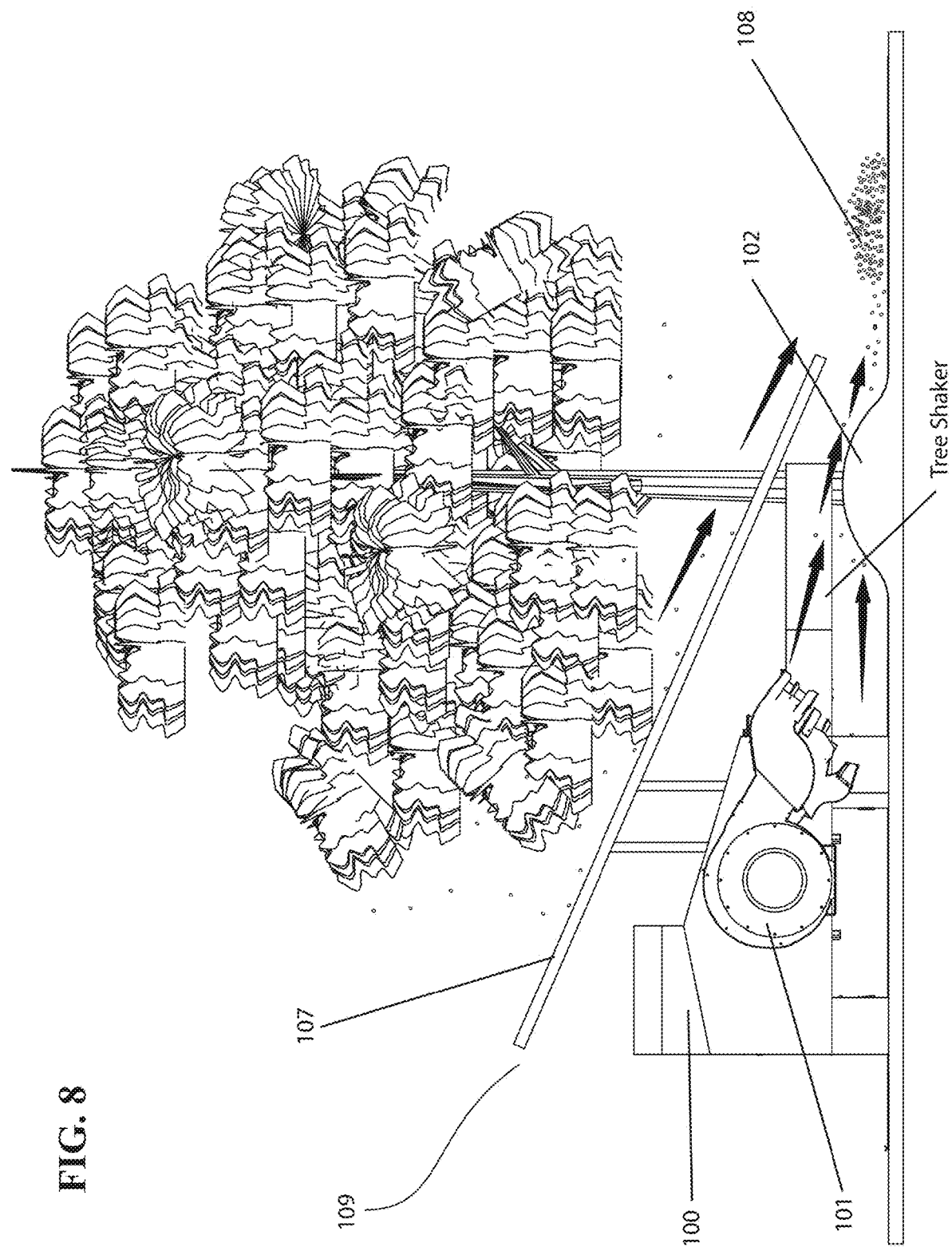
FIG. 8 is an illustration of the method and system of this invention showing a simplified end view of the harvester in the position to shake or vibrate the tree. The harvester 100 in this picture has a canopy 107 of the machine which is used to deflect the tree fruit or nuts away from the tree row 102. The attached blower 101 moves the fruit in the tree row 102 that were there prior to the harvester shaking the tree. As a result, a deflected windrow 108, is created from deflecting and blowing the tree fruit or nuts. The deflected windrow 108 is not necessarily as tight and organized as a swept windrow 104, but its relative position to the tree row 102 allows it to either be picked up or swept with less passes. The red arrows in the illustration depict the travel of the fruit from the tree to the deflected windrow 108 and from the ground to the deflected windrow 108 via the blower 101.
Figure 9:
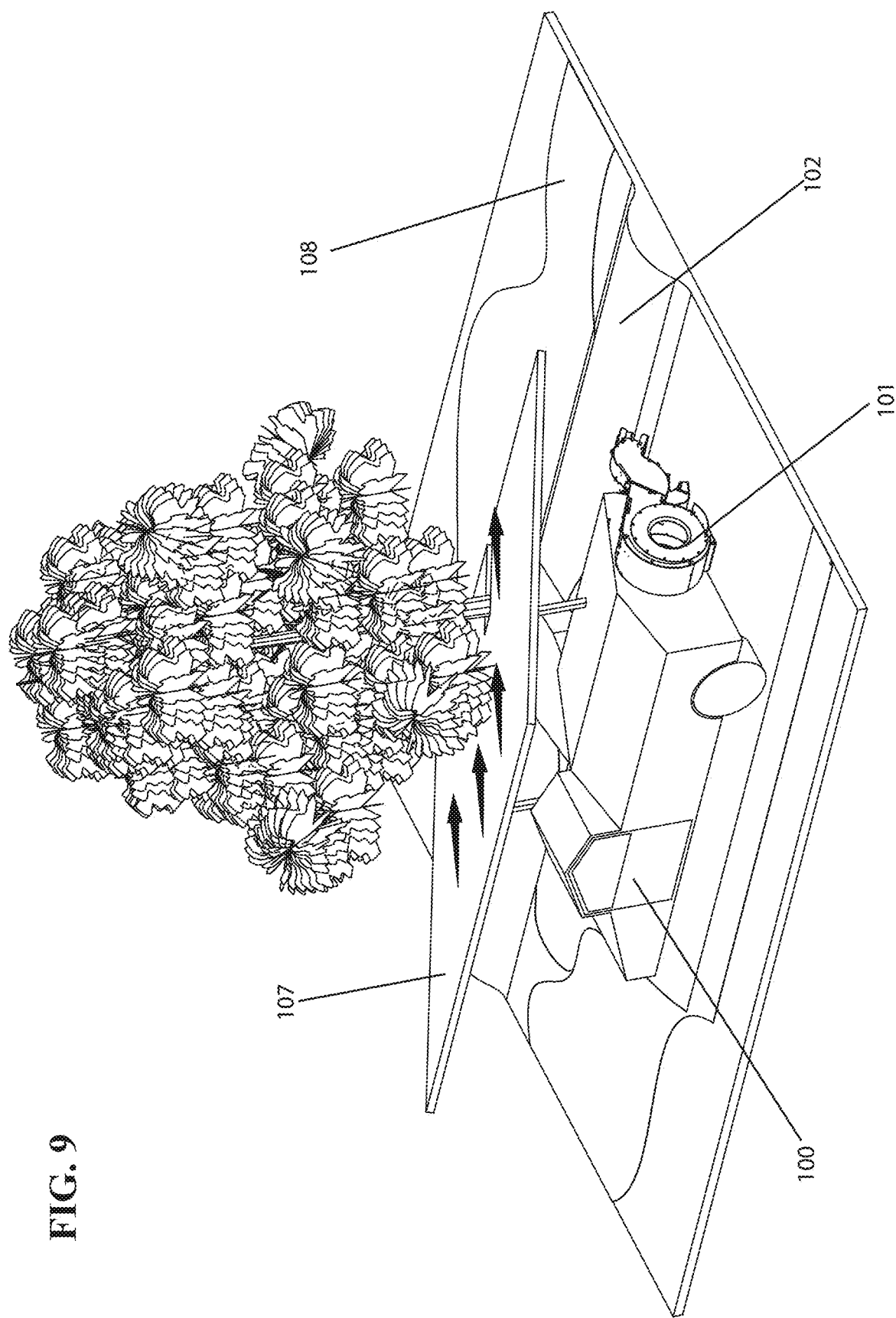
FIG. 9 is an illustration of the method and system of this invention showing a simplified isometric view of the harvester in the position to shake or vibrate the tree. The harvester 100 in this picture has a canopy 107 on the machine which is used to deflect the tree fruit or nuts away from the tree row 102. The resulting deflected windrow 108 is shown in its progression as a result of the system of this invention. The deflected windrow 108 is not only being developed by the deflected nuts off of the canopy 107 but also the blower 101 moving windfall fruit off of the tree row 102.
Figure 10:
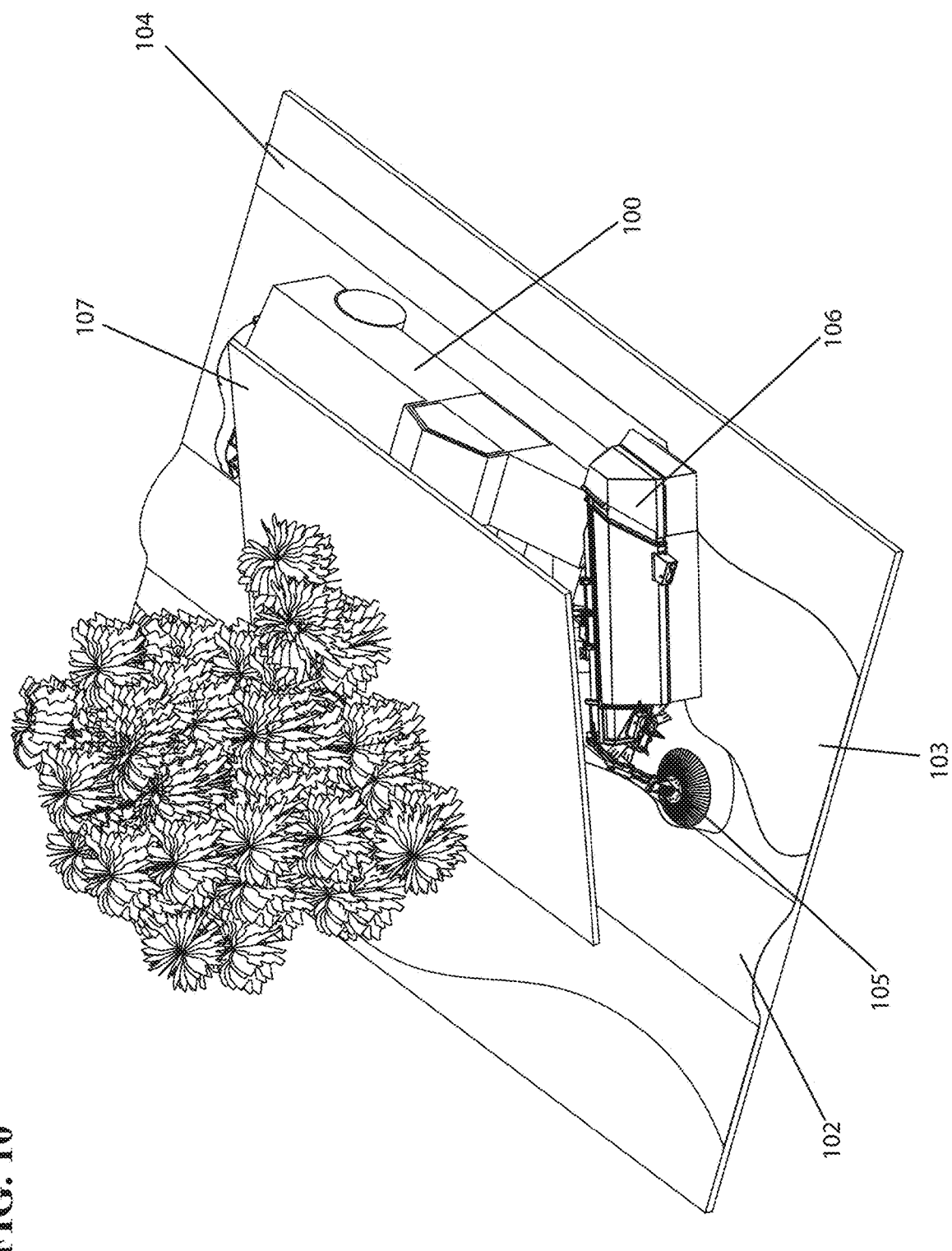
FIG. 10 is an illustration of the front view of the method and system of this invention with the addition of a mechanical tree row cleaner, 105, and the windrowing device, 106. This tree row cleaner could be a rotary brush 105 located on the machine as shown. This rotary brush 105 would be used to move the nuts away from the tree row 102. The windrowing device 106 could be a sweeper head which would create the resulting swept windrow 104 as shown. The carpet of tree fruit 103 is the result of the harvester 100 displacing the tree fruit from its host.
Figure 11:
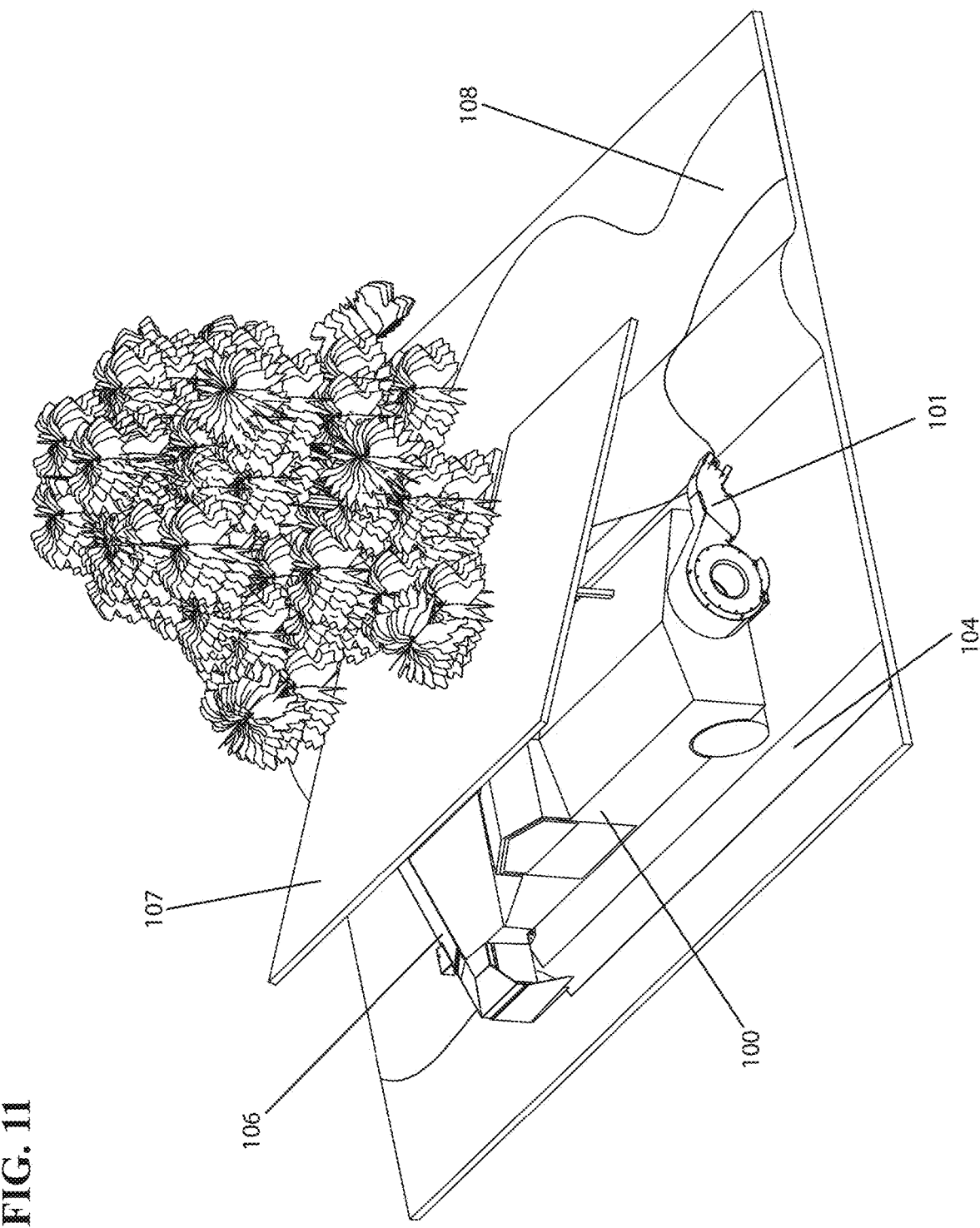
FIG. 11 is a rear view of the same system shown in FIG. 10 with a depiction of the deflected windrow 108 being created on the opposite side of the harvester 100. The blower 101, is also assisting in creating the deflected windrow 108, by blowing windfall off of the tree row 102.

Referring to FIG. 3, the harvester 100 is shown in the normal position to shake or vibrate the tree. The harvester 100 is considered any machine or device used to displace the tree fruit or nuts from its host. The tree row 102 has tree fruit or nuts 103 on it that have either fallen from the tree due to natural occurrences from things like wind or rain or from the process of shaking the tree. In order to be picked up the tree fruit or nuts 103 need to be moved out from under the tree 102 and into the center of the windrow 104. In this case a "tree row" 102 can vary in different sizes and shapes, and may be flat. In essence the tree row 102 would be the strip of soil where the tree grows and in between each tree down the tree row.

A deflection plate 107 above the harvester 100 would assist in reducing or eliminating the need for additional sweeping passes. The deflection plate 107 may be angled such that tree fruit or nuts shaken a tree or bush may be deflected out of the tree line and into the adjacent access path where the fruit or nuts can be easily accessed by a windrowing machine. By manipulating the location of the tree fruit or nuts after it has been displaced from its host but before it reaches the ground, the need to move the nuts out of the tree row 102 by mechanical or air pressure mechanism is reduced. As a result, with a reduction in ground engagement needed to move the tree fruit or nuts 103, the dust created in the sweeping/blowing operation is also reduced.

The harvester 100 may include additional mechanisms for moving fruit or nuts out of the tree row 102. The deflection plate 107 may be assisted in the movement of the fruit or nuts out of the tree row 102 by additional devices for moving the fruit or nuts 103. The deflection plate 107 may allow some of the fruit or nuts to land in the tree row 102 and some fruit and nuts 103 fall before the harvester 100 engages and shakes the tree or bush. The remaining fruit and nuts 103 may be moved out of the tree row 102 by one or more additional mechanisms. In some embodiments, the harvester 100 may include a blower 101. The blower 101 may be a centrifugal fan blower, rated to deliver an approximate air flow in a range of 1,500 CFM to about 5000 CFM. However, any fan, suited to industrial use with the desired performance characteristics, could be utilized. The blower 101 may be positioned on the harvester 100 such that its air flow is directed across the tree row 102, such that it aids in moving the fruit or nuts into the adjacent access path on the other side of the tree row 102.

The harvester 100 may include a brush 105 and/or a sweeping head 106, which may move the tree fruit or nuts that are on the ground in the tree row 102 into a windrow in the access pass down which the harvester 100. The brush 105 and/or sweeping head 106 may be oriented are able to be moved into a windrow in a location where a pick-up machine can pick up the tree fruit or nuts, thus eliminating the need for a separate sweeper. The harvester 100 may include a brush 105 that is angled with respect to the longitudinal axis of the harvester 100 such that the fruit and nuts on the ground are moved toward a central area of the access path to form a windrow 104. The brush 105 may include a revolving set of bars ("revolving bar assembly") that are each connected by pivots at each end to two parallel rotating hubs, where each bar includes a descending brush-like set of tines. The hubs may rotate in parallel vertical planes that are oblique to the longitudinal axis of the sweeper. The transfer brush is connected to one of the hubs and rotates with the hub in a third rotational plane that is parallel to the rotational planes of the hubs and may be oblique to the longitudinal axis of the sweeper. The length of each of the revolving bars is oblique to the surface of the hubs. The revolving bars may rotate with the hubs and also orbit around an axis that is oblique relative to the longitudinal axis of the sweeper and rotational planes of the hubs. The revolving bar assembly transfers the nuts toward a windrow as the tine brushes of each bar successively push the nuts in a direction that is parallel to the rotational plane of the hubs. Other forms of brushes may be utilized in the sweeper 100 as well.

The sweeping head 106 may have circular shaped brush with radially positioned bristles, and may rotate around axis of the circular shape. The circular brush may be rotatably mounted on an armature that holds the brush at a distance to the body of the harvester 100 and such that the circular brush is adjacent to brush 105. The circular brush may rotate approximately parallel and in close proximity to the ground surface, and may be tilted to contact the ground surface at an outer edge of the circular brush. The circular brush may be operable to collect fruit or nuts 103 from the tree row 102 and transfer them to brush 105. The brush 105 may then transfer the fruit or nuts 103 to a windrow 104, in preparation for a "pick-up" machine to complete the harvesting operation. The blower 101, brush 105 and/or sweeping head 106 is attached, pulled, pushed or somehow linked to the harvester 100.

The scope of the present invention may include any combination of the blower 101, brush 105, and sweeping head 106. The scope of the present invention also includes variations on the blower 101, brush 105, and sweeping head 106 described herein. Any device that moves the tree fruit or nuts with the force of air, mechanical manipulation or the likes thereof off of the tree row 102 once the tree fruit or nut reaches the ground may be substituted for those devices described herein with respect to the blower 101, brush 105, and sweeping head 106.

Although the above example refers to the specific embodiments provided in the figures, it is to be appreciated that the present invention encompasses other embodiments that those shown in the figures. It is to be understood that variations and modifications of the present invention may be made without departing from the scope thereof. It is to be appreciated that the features disclosed herein may be used different combinations and permutations with each other, all falling within the scope of the present invention. It is also to be understood that the present invention is not to be limited by the specific embodiments disclosed herein, but only in accordance with the appended claims when read in light of the foregoing specification.

What is claimed:

1. A harvesting machine comprising:
    a. a shaking mechanism operable to shake fruit or nuts from a tree or bush, wherein said shaking mechanism is located on a first lateral side of the harvesting machine;
    b. a windrowing brush for windrowing fruit or nuts present on the same side of said tree or bush as said harvesting machine; and
    c. a blowing mechanism positioned posteriorly to said shaking mechanism for moving said fruit or nuts shaken free by said shaking mechanism from a base of the tree or bush and away from a row in which the tree or bush is positioned, wherein said blowing mechanism is located on said first lateral side of the harvesting machine.

2. The machine of claim 1, further comprising a deflection plate for directing said fruit or nuts to the ground on an opposite side of said tree or bush from a position of the harvesting machine, wherein said deflection plate is positioned at an angle of between 0° to about 75° relative to a horizontal plane.

3. The machine of claim 2, wherein said deflection plate comprises a slot for positioning around a trunk or center of said tree or bush.

4. The machine of claim 1, further comprising a rotating brush having a plane of rotation that is substantially parallel to a horizontal plane.

5. The machine of claim 4, wherein said rotating brush has a portion operable to contact a ground surface near said base of said tree or bush while said shaking mechanism is engaged with said tree or bush.

6. A harvesting machine comprising:
   a. a shaking mechanism operable to shake fruit or nuts from a tree or bush in a row, wherein said shaking mechanism is located on a first lateral side of the harvesting machine;
   b. a rotating brush having a portion operable to contact the ground near a base of said tree or bush while said shaking mechanism is engaged with said tree or bush; and
   c. a blower mechanism positioned posteriorly to the shaking mechanism and having an outlet directed outward from said first lateral side for moving said fruit or nuts shaken free by said shaking mechanism to an opposite side of said row from said harvesting machine.

7. The machine of claim 6, further comprising a deflection plate positioned at an angle of between 0° to about 75° relative to a horizontal plane.

8. The machine of claim 7, wherein said deflection plate comprises a slot for positioning around a trunk or center of said tree or bush.

9. The machine of claim 6, further comprising a windrowing brush for windrowing fruit or nuts present on the same side of said tree or bush as said machine shakes fruit or nuts from a tree or bush.

10. A method of harvesting using a harvesting vehicle comprising:
    a. attaching a shaking mechanism operable to shake fruit or nuts from a tree or bush in a row;
    b. activating said shaking mechanism to vibrate said tree or bush such that said fruit or nuts fall from said tree or bush; and
    c. activating a blowing mechanism for moving said fruit or nuts away from a base of the tree or bush to an opposite side of said row from said harvesting vehicle.

11. The method of claim 10, further comprising positioning a deflection plate for directing said fruit or nuts to a ground surface in an area away from said base of said tree or bush.

12. The method of claim 11, wherein said deflection plate comprises a slot for positioning around a trunk or center of said tree or bush.

13. The method of claim 11, wherein said deflection plate is positioned at an angle of between 0° to about 75° relative to a horizontal plane.

14. The method of claim 10, further comprising activating a rotating brush having a plane of rotation that is substantially parallel to the horizontal and moves said fruit or nuts from said base of said tree or bush.

15. The method of claim 14, wherein said rotating brush has a portion operable to contact a ground surface near the base of the tree or bush while said shaking mechanism is engaged with said tree or bush.

\* \* \* \* \*